Patented Sept. 20, 1932

1,878,022

UNITED STATES PATENT OFFICE

REGINALD K. STRATFORD, OF SARNIA, ONTARIO, CANADA, ASSIGNOR TO STANDARD OIL DEVELOPMENT COMPANY, A CORPORATION OF DELAWARE

PROCESS FOR THE RECOVERY OF SOLVENTS USED IN THE PURIFICATION OF HYDROCARBONS

No Drawing.   Application filed May 21, 1928. Serial No. 279,602.

The present invention relates to the art of refining mineral oils and more specifically comprises an improved method for the recovery of solvents used for the extraction of hydrocarbon oils. My improved process will be fully understood from the following description.

The oil layer may be treated with successive batches of solvent as will be understood. The present invention comprises the recovery of the solvent for reuse and the process may be practiced separately on the various batches or on the combined spent solvent.

Extraction oil used in my process should be lower boiling than the oil originally treated and it is preferable to use an extraction oil with a considerably lower boiling range. The extraction oil used in my process, which will be conveniently termed naphtha, may be derived from any suitable source. An example of such an extraction oil is petroleum naphtha. Separation between the naphtha and the extract may be accomplished conveniently by distillation and the naphtha may be used to treat additional quantities of spent solvent.

In some instances it may be desirable to omit the separation of naphtha and the extract. The mixture may be utilized as such, for example, as a solvent or turpentine substitute.

It often happens that a small quantity of the solvent may be dissolved in the mixture of extract and extracting agent which forms a layer after agitation in my process, and it is desirable to remove this solvent from the oils. The method preferred depends in general on the character of solvent. If furfurol is used, it may be conveniently removed by washing the oil with a solution of sodium bi-sulphite as is well known. A water or aqueous akaline wash is sufficient if phenol is used, and for separation of aniline a wash with dilute acids such as hydrochloric acid has been used.

The various solvents may be recovered by well known methods.

As an example of my process a Colombian refined oil having the following characteristics is treated three times successively with equal volumes of a solution of 90% phenol and 10% water at about 77° F.

Gravity_____39.8° A. P. I.
Viscosity_____415 Saybolt thermo @ 60° F.

After each treatment the phenol layer is removed and the total amount of oil removed by extraction is about 30%. The purified oil is then washed with water and is found on inspection to have the following characteristics:

Gravity_____42.5° A. P. I.
Viscosity_____425 sec. Saybolt thermo

In recovering the phenol the three batches of phenol containing extract dissolved therein as obtained above are united and the mixture is washed twice, each time with 50% of its volume of a light petroleum naphtha having a gravity of about 65° A. P. I. The phenol containing the naphtha is heated to distill off the naphtha and is ready for use as a solvent once more.

My process is not to be limited to the recovery of any particular solvent but is applicable to all liquid solvent whether pure compounds or mixtures of two or more substances. My process is not to be limited by any theory of the process nor by any example given merely by way of illustration but only by the following claims in which I wish to claim all novelty inherent in my process.

I claim:

1. The process of separating extracted material from a solvent used for preferential extraction of petroleum of oil, which comprises contacting the solvent containing extract with petroleum oil, which is of lower specific gravity and lower boiling range than the extracted oil, settling the mixture, and separating the layers so formed.

2. Process according to claim 1, in which naphtha is used to remove extract from phenol.

3. The process of separating extract from a solvent which has been used for preferential extraction of a petroleum oil, which comprises contacting the extract material in the solvent with a petroleum oil of lower specific gravity and lower boiling range than the extract, settling the mixture to form two layers, separating the layers one containing the extract and the lower specific gravity petroleum oil and the other the solvent, and distilling the layer of solvent and lower specific gravity petroleum oil to recover the solvent in the residue.

4. Process according to claim 3 in which the solvent is phenol.

5. Process according to claim 3 in which the lower specific gravity petroleum oil is naptha.

REGINALD K. STRATFORD.